Figure 1:
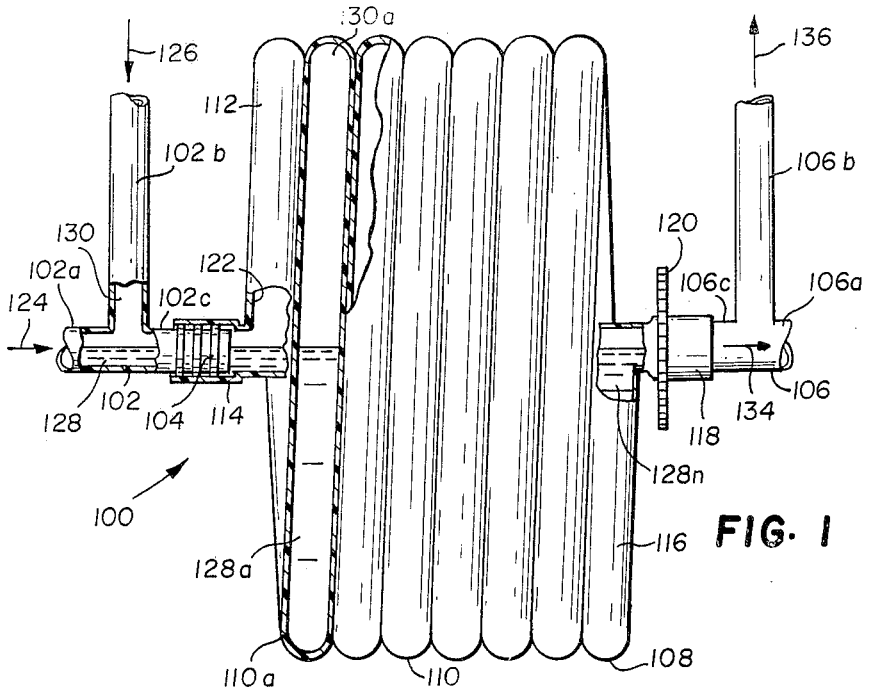
Figure 2:
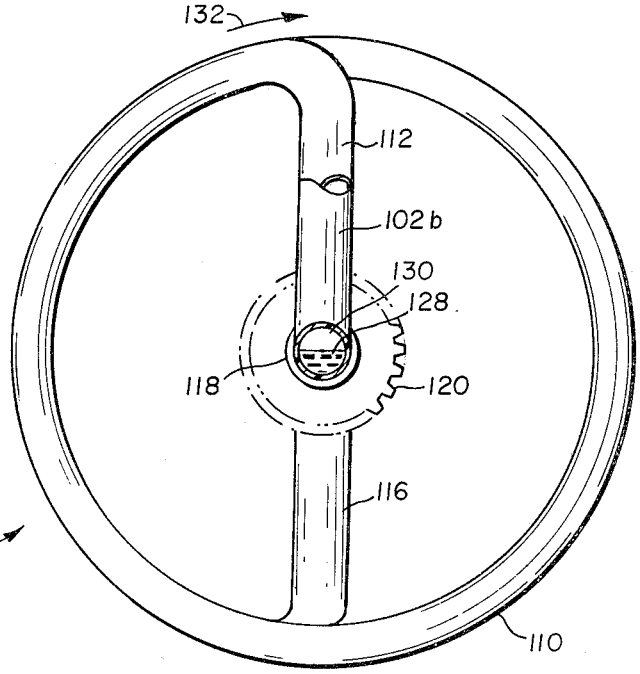
Figure 3:
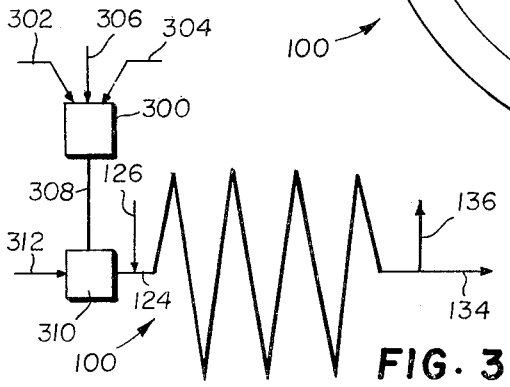

United States Defensive Publication [19] (H) [11] T103,603

Baugher et al. [43] Nov. 1, 1983

[54] PROCESS AND APPARATUS FOR PREPARING SILVER HALIDE EMULSIONS

[76] Inventors: Jeffrey S. Baugher; Douglas L. Oehlbeck; Barry M. Brown, all of Kodak Park, Rochester, N.Y. 14650

[21] Appl. No.: 447,378

[22] Filed: Dec. 6, 1982

[51] Int. Cl.[3] ..... G03C 1/02; B01F 15/02; B01F 9/00

[52] U.S. Cl. ..... 430/569; 366/135; 366/220; 138/177; 137/177; 137/197

[57] ABSTRACT

A process is disclosed for preparing a silver halide emulsion comprised of serially receiving a silver halide emulsion at an upstream location, supplying the silver halide emulsion in a further prepared form at a downstream location, and transporting the silver halide emulsion between the upstream and downstream locations while it is being further prepared. The silver halide emulsion is divided into discrete segments as it is received at the upstream location. The discrete segments of the silver halide emulsion are transported between the upstream and downstream locations in the sequence of their formation. The emulsion can be finished as it is transported to the downstream location. The silver halide grains can be shelled during transport. In still another application a converted-halide emulsion can be formed during transport to the downstream location. An apparatus for the preparation of the silver halide emulsion is comprised of a tubular helix capable of being oriented so that its longitudinal axis is substantially horizontal. The tubular helix defines an inlet and an outlet. Means are provided for rotating the tubular helix about its longitudinal axis, and means are provided for supplying silver halide emulsion to the inlet of said tubular helix when the inlet lies below the longitudinal axis.

10 Claims, 1 Sheet Drawing,

16 Pages Specification

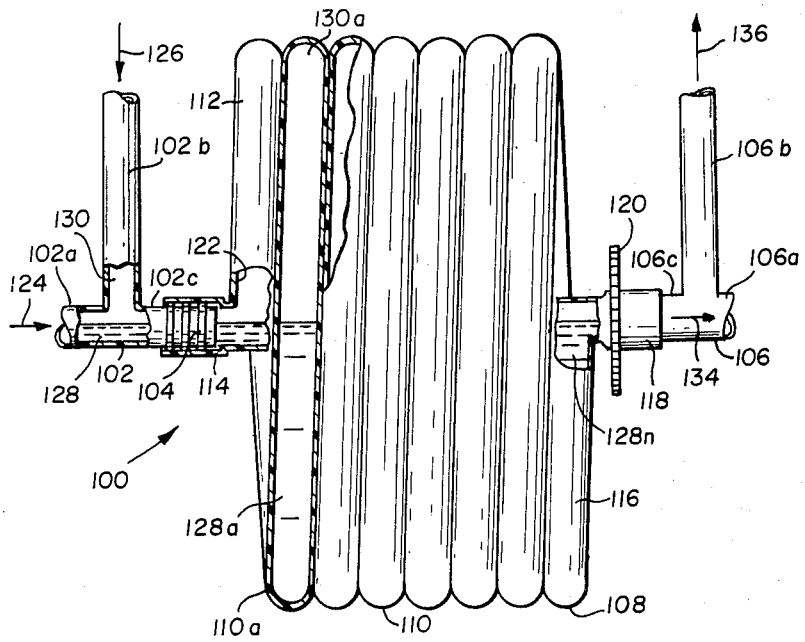

The file of this unexamined application may be inspected and copies thereof may be purchased (849 O.G. 1221, Apr. 9, 1968).